Patented July 13, 1926.

1,592,641

UNITED STATES PATENT OFFICE.

FERDINAND W. NITARDY, OF BROOKLYN, NEW YORK, ASSIGNOR TO E. R. SQUIBB AND SONS, OF NEW YORK, N. Y., A CORPORATION OF NEW YORK.

PRESERVATION OF OIL.

No Drawing.  Application filed August 5, 1925. Serial No. 48,303.

This invention relates to the preservation of oils, particularly castor oil, in a substantially tasteless and odorless condition. The use of oils which have a disagreeable odor and taste is more or less restricted because of these characteristics, and numerous investigations have been conducted for the purpose of destroying the odor and taste of castor and other oils of a similar character so that their use may be made more agreeable. It is possible, for example, to remove the odor and taste from castor oil by various methods, of which the most practicable is vacuum distillation with steam. According to this method the oil is placed in a suitable vacuum pan and steam is passed through it while the space above the oil is maintained under reduced pressure so that the vapors arising from the oil are withdrawn immediately therefrom. The oil itself is not distilled but the more or less volatile elements which give it a nauseous odor and taste are removed to a substantial extent and the oil is thus rendered practically tasteless and odorless.

It is characteristic of oils which have been subjected to this and other treatments to make them tasteless and odorless that upon exposure to the atmosphere a reversion occurs and the taste and odor reappear in a relatively short time. No certain explanation of this phenomenon can be set forth at this time but presumably the result observed is caused by the oxygen of the atmosphere.

It is the object of the present invention to avoid the reappearance of odor and taste in castor and similar oils after the latter have been subjected to a special treatment to render them odorless and tasteless. When the object is accomplished the oils can be stored in suitable containers and held for any desired period.

I have discovered that tasteless and odorless castor and other oils of a similar character can be preserved substantially indefinitely by preventing contact of the atmosphere therewith. This is accomplished in large storage containers by removing the air from the space above the oil and substituting therefor an inert gas such as nitrogen or carbon dioxide. The same expedient can be employed in preserving oils such as castor oil in the small receptacles used in supplying the product to the trade. However, these small containers are intended to be opened frequently and air will mix with the inert gas so that the preservation of the oil can be assured no longer than the container remains unopened.

I have also discovered that certain substances when added to the oil inhibit the return of the taste and odor thereto even though such substances are employed in relatively minute quantities so that they impart none of their characteristics to the oil. Some of these substances are reducing in nature and it might be assumed that the effect is due to the ability of the added substances to absorb oxygen and to prevent thus the action of oxygen upon the oil. However, it cannot be determined that the result obtained depends actually upon the reducing character of the added substance and the inhibiting effect may be, in fact, the result of some other influence, the inhibiting agents acting, for example, as negative catalyzers.

In the preferred embodiment of the invention I add to the oil, which has been rendered tasteless and odorless, a small amount of benzyl alcohol. From ¼% to 5% of benzyl alcohol thus added has been found to be very effective in preventing the return of taste and odor to castor oil. In carrying out the invention the desired proportion of benzyl alcohol, preferably about 1%, is added to and thoroughly mixed with the oil. The latter is then preferably sealed in suitable containers but reversion and reappearance of the odor and taste do not occur even when the oil is exposed to the atmosphere.

The addition of small amounts of benzyl alcohol to castor and other oils of a similar character does not affect the appearance or other characteristics, either physical or therapeutic, of the oil. The added substance serves, however, in some manner to prevent the formation of those ingredients of castor oil which give to this oil its characteristic odor and taste. Benzyl alcohol in such minute proportions as those indicated has no effect upon the user of the oil, and consequently castor and other oils of a similar character to which benzyl alcohol has been added can be employed in the usual way without fear of injury.

The invention provides a simple and inexpensive method for preserving castor and other oils which have been rendered tasteless and odorless. The addition of the inhibiting agent can be practiced either by itself or in conjunction with packing under inert gases. Thus in the small containers furnished to the trade, the oil, if treated as hereinbefore described, will remain tasteless and odorless even though the container is opened repeatedly and the contents is exposed thus to the atmosphere. The invention permits the packaging and marketing of castor and other oils in a tasteless and odorless form and will, therefore, encourage the use of oils which are otherwise objectionable to the consumer.

Various changes may be made in the added proportions of the inhibiting agent as hereinbefore indicated without departing from the invention or sacrificing any of the advantages thereof.

I claim:—

1. The method of preventing the development of odor and taste in castor oil from which the odor and taste have been removed, which comprises mixing benzyl alcohol with the oil.

2. The method of preparing oils for alimentary and other purposes, which comprises subjecting the oil to a treatment to remove odor and taste therefrom and adding benzyl alcohol to the oil.

3. The method of preparing oils for alimentary and other purposes, which comprises treating the oil with steam under vacuum and adding benzyl alcohol to the oil.

4. The method of preventing the development of odor and taste in oils from which the odor and taste have been removed, which comprises mixing from $\frac{1}{4}\%$ to $5\%$ of benzyl alcohol with the oil.

5. The method of preparing castor oil for alimentary and other purposes, which comprises removing the odor and taste therefrom and adding from $\frac{1}{4}\%$ to $5\%$ of benzyl alcohol to the oil.

6. The product comprising castor oil from which the odor and taste have been removed and containing benzyl alcohol as an inhibiting agent to prevent redevelopment of odor and taste.

7. The product comprising castor oil from which the odor and taste have been removed and containing from $\frac{1}{4}\%$ to $5\%$ of benzyl alcohol as an inhibiting agent to prevent redevelopment of odor and taste.

In testimony whereof I affix my signature.

FERDINAND W. NITARDY.